(12) United States Patent
Strom et al.

(10) Patent No.: US 8,582,232 B2
(45) Date of Patent: Nov. 12, 2013

(54) HEAT ASSISTED SPINDLE MOTOR

(75) Inventors: Brian D. Strom, Cupertino, CA (US); SungChang Lee, San Jose, CA (US); Joerg Ferber, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 599 days.

(21) Appl. No.: 12/012,883

(22) Filed: Feb. 5, 2008

(65) Prior Publication Data

US 2009/0195923 A1 Aug. 6, 2009

(51) Int. Cl.
*G11B 17/02* (2006.01)

(52) U.S. Cl.
USPC ............................................. 360/99.08

(58) Field of Classification Search
USPC ............................................. 360/99.08
See application file for complete search history.

(56) References Cited

FOREIGN PATENT DOCUMENTS

| JP | 11213624 A | * | 8/1999 |
| JP | 2001132752 A | * | 5/2001 |

* cited by examiner

*Primary Examiner* — David D Davis

(57) ABSTRACT

A hard disk drive with a spindle motor that rotates a disk. When the disk drive is exposed to low temperatures a current can be provided to the spindle motor to heat the motor. For example, a DC current can be provided to the spindle motor. The current flowing through the spindle motor coil generates heat. The current can be provided for a predetermined time interval to sufficiently heat the spindle motor so that the fluid bearings of the motor can operate. The current is terminated and then an AC current is provided to the spindle motor to cause motor rotation.

19 Claims, 3 Drawing Sheets

HEAT ASSISTED SPINDLE MOTOR

BACKGROUND OF THE INVENTION

1. Field of the Invention

The present invention relates to preheating a spindle motor of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. Rotation of the disk also allows for access to data located across the disk surfaces.

Hard disk drives may be used in systems, such as automobiles, that are exposed to relatively low temperatures. For example, automobiles may include a disk drive. Automobiles can be exposed to extreme ambient temperatures. The spindle motor of a disk drive typically has some type of fluid bearing. At very low temperatures the fluid bearing may be to stiff to allow for proper actuation of the spindle motor.

BRIEF SUMMARY OF THE INVENTION

A hard disk drive that includes a spindle motor to rotate a disk of the drive. The disk drive also includes a circuit that provides current to the spindle motor to heat the motor before the disk is rotated.

DETAILED DESCRIPTION

Disclosed is a hard disk drive with a spindle motor that rotates a disk. When the disk drive is exposed to low temperatures a current can be provided to the spindle motor to heat the motor. For example, a DC current can be provided to the spindle motor. The current flowing through the spindle motor coil generates heat. The current can be provided for a predetermined time interval to sufficiently heat the spindle motor so that the fluid bearings of the motor can operate. The current is terminated and then an AC current is provided to the spindle motor to cause motor rotation.

Figure 1:
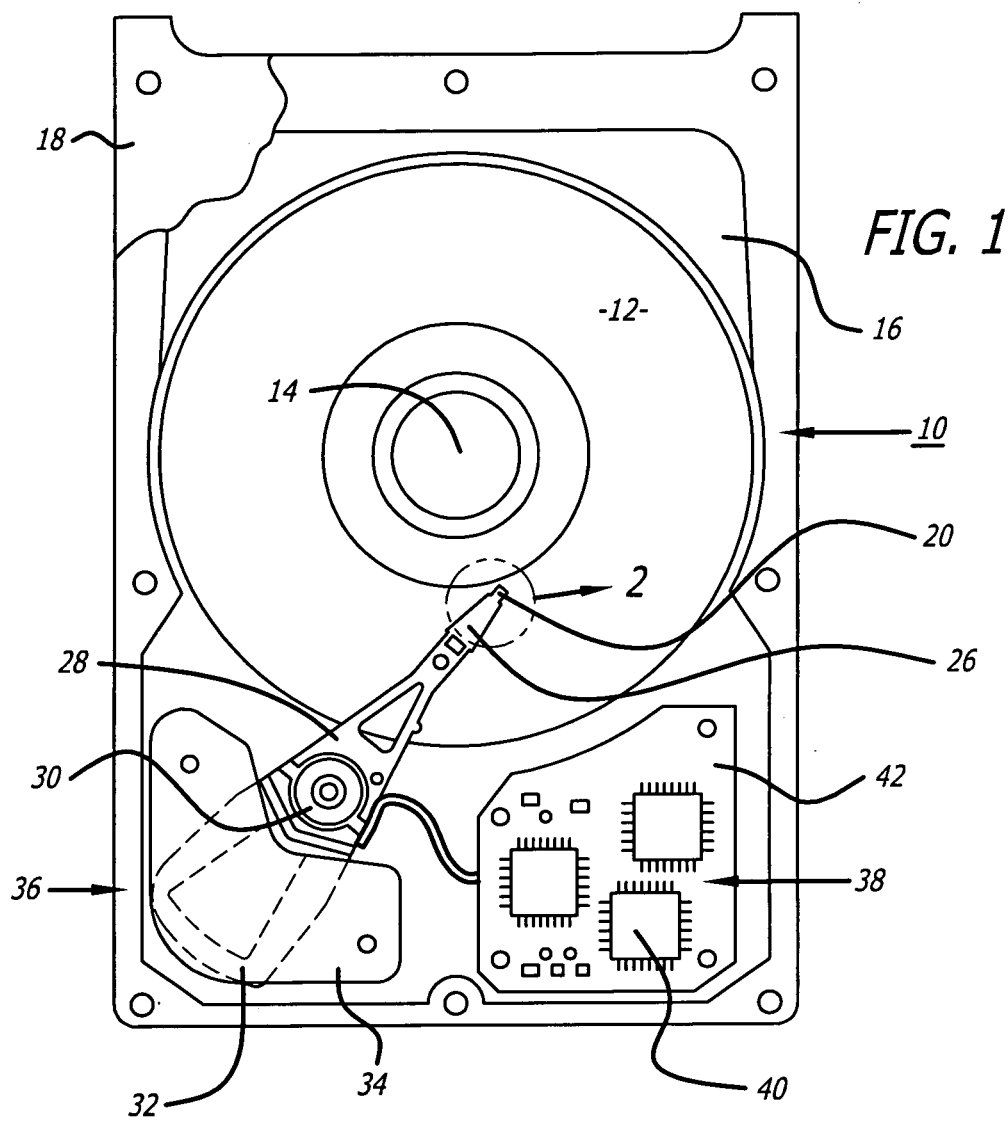
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
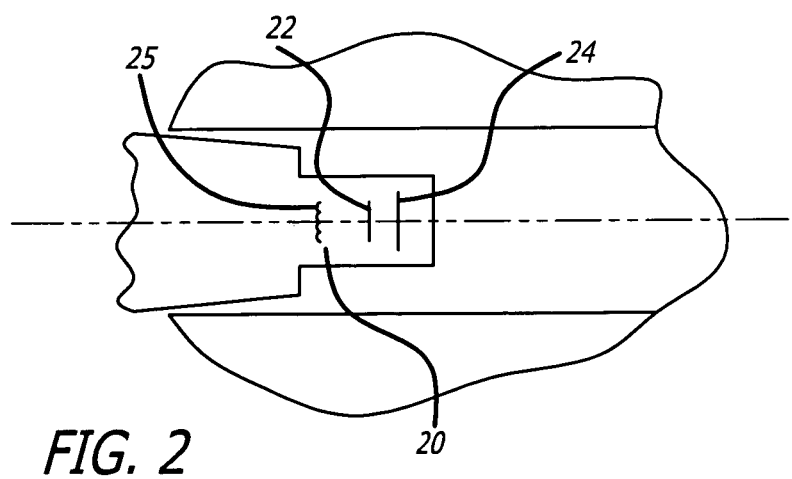
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The head 20 may be a perpendicular recording head.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 42 is coupled to the voice coil 32, heads 20 and spindle motor 14 by wires (not shown).

Figure 3:
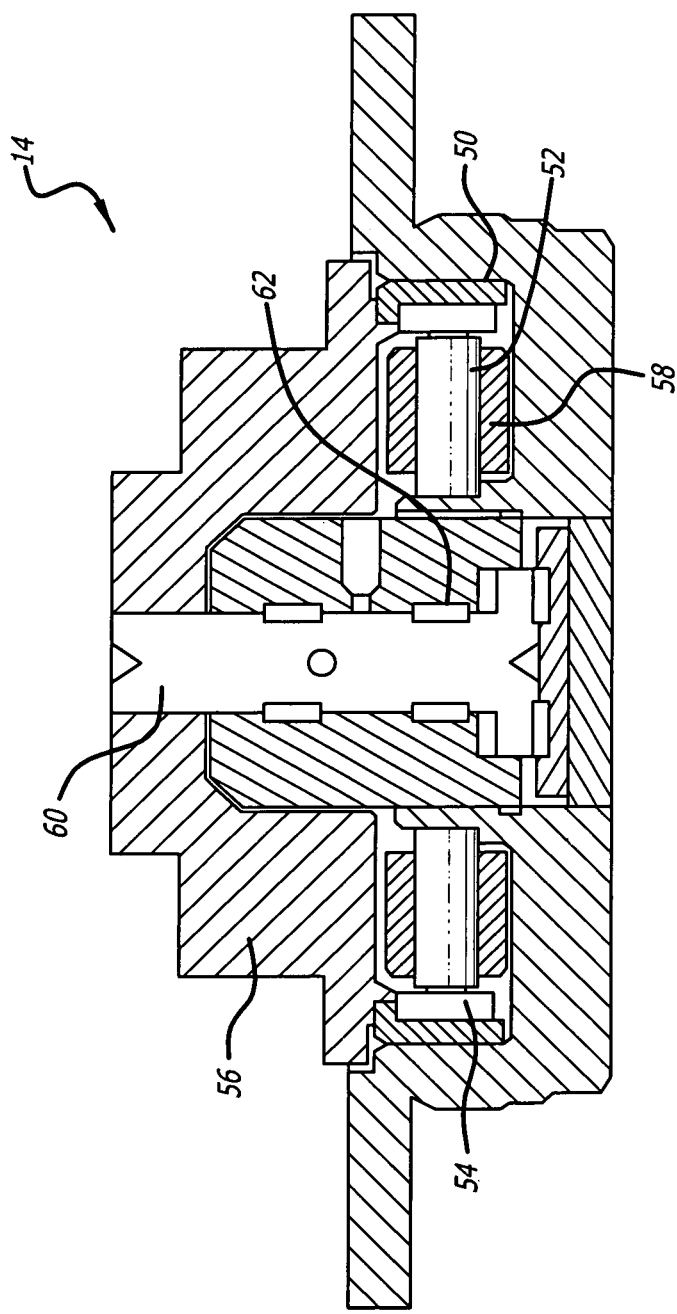
FIG. 3 is a side view of a spindle motor of the disk drive.

FIG. 3 shows an embodiment of a spindle motor 14. The spindle motor 14 includes a rotor 50 and a stator 52. The rotor 50 includes permanent magnets 54 that are attached to a shaft hub 56. The stator 52 includes a coil 58. An electromagnetic force is generated to rotate the hub 56 when an AC current is provided to the coil 58 as is known in the art.

The hub 56 is attached to a rotor shaft 60 that also rotates. The spindle-motor 14 includes a journal bearing 62 that minimizes friction while the shaft 60 is rotating. The journal bearing 62 typically contains a fluid such as an oil.

Figure 4:
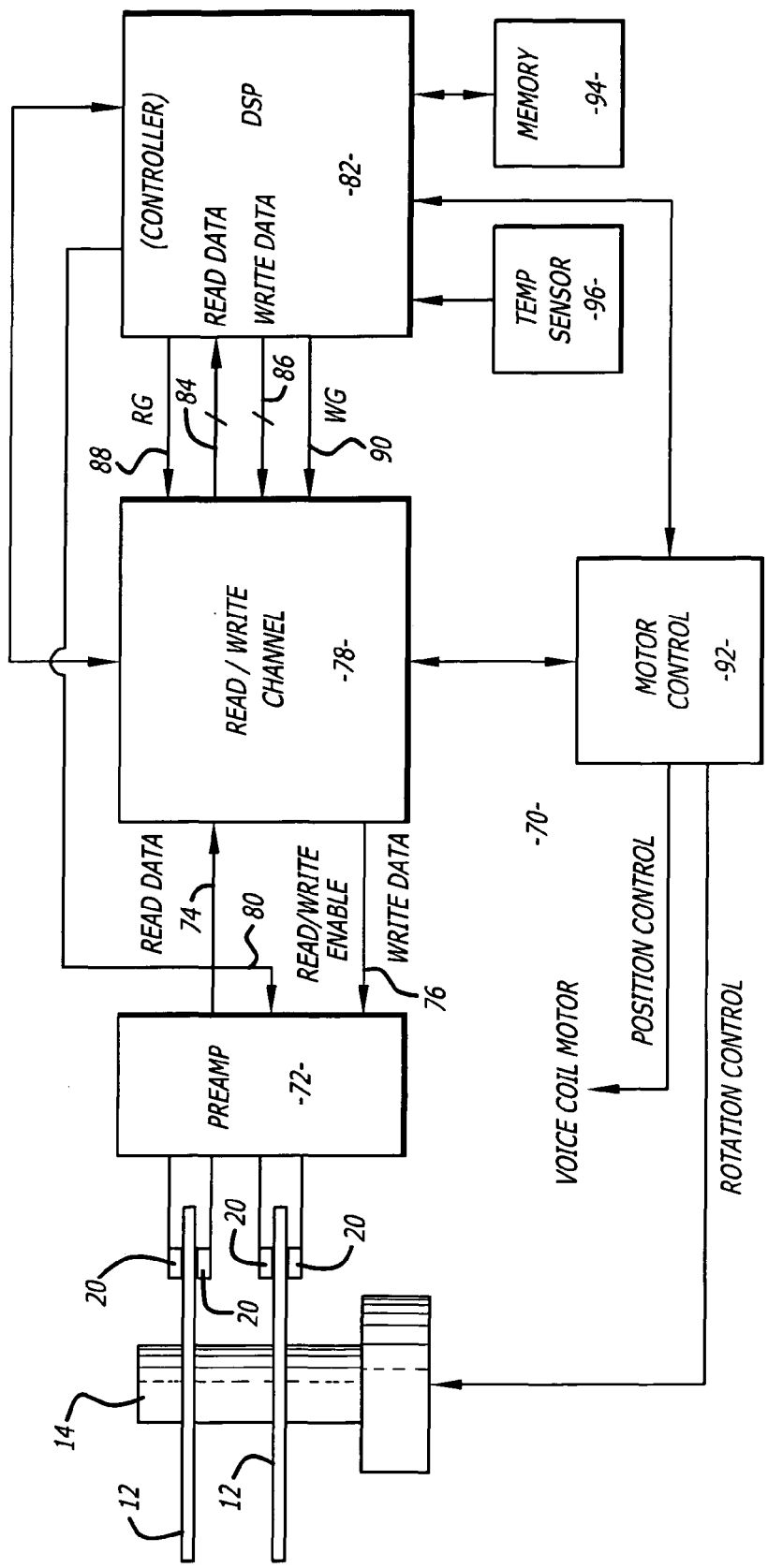
FIG. 4 is a schematic of an electrical circuit for the hard disk drive.

FIG. 4 shows an electrical circuit 70 for reading and writing data onto the disks 12. The circuit 70 may include a preamplifier circuit 72 that is coupled to the heads 20. The pre-amplifier circuit 72 has a read data channel 74 and a write data channel 76 that are connected to a read/write channel circuit 78. The pre-amplifier 72 also has a read/write enable gate 80 connected to a controller 82. Data can be written onto the disks 12, or read from the disks 12 by enabling the read/write enable gate 80.

The read/write channel circuit 78 is connected to the controller 82 through read and write channels 84 and 86, respectively, and read and write gates 88 and 90, respectively. The read gate 88 is enabled when data is to be read from the disks 12. The write gate 90 is to be enabled when writing data to the disks 12. The controller 82 may be a digital signal processor that operates in accordance with a software routine, including a routine(s) to write and read data from the disks 12.

The read/write channel circuit 78 and controller 82 may also be connected to a motor control circuit 92 which controls the voice coil motor 36 and spindle motor 14 of the disk drive 10. The motor control circuit 92 provides a current to the voice coil motor 36 and a current to the spindle motor 14 to actuate each component, respectively.

The controller 82 may be connected to a non-volatile memory device 94. By way of example, the device 94 may be a read only memory ("ROM"). The non-volatile memory 94 may contain the instructions to operate the controller and disk drive. Alternatively, the controller 82 may have embedded firmware to operate the drive.

The disk drive may also include a temperature sensor 96 that is connected to the controller 82. Although the sensor 96 is shown connected to the controller 82, it is to be understood that the sensor 96 may be connected to the motor control circuit 92.

When the temperature sensor 96 senses a temperature below a threshold value, a further circuit of the integrated circuits 40 of FIG. 1 can provide a first current to the spindle motor 14. By way of example, the threshold temperature value may be −5° C. The current may be DC current so that the spindle motor 14 does not rotate. Alternatively, the current may be AC with a frequency which would not cause rotation of the spindle motor 14.

The current flows through the coil of the spindle motor 14 (see FIG. 3). The current generates heat that dissipates through the motor 14. The heat transfers into the journal bearing to heat the oil therein. The current is provided for a predetermined time interval to sufficiently heat the oil. The time interval may vary depending on the temperature and the thermal impedance of the spindle motor. The time interval may also vary for different levels of current.

The current is terminated after the time interval. The motor control circuit 92 can then provide a second current to the spindle motor 14 to cause motor rotation and a spinning of the disk 12. The second current is an AC current. The scheme disclosed pre-heats the spindle motor 14 to insure that the bearings are at a sufficient operating temperature.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus, comprising:
a spindle motor comprising a coil;
a first circuit for providing a first current to said coil to heat said spindle motor, wherein said first current is applied for a predetermined time interval and subsequently terminated before a disk is rotated; and
a second circuit for providing a second current to said coil to rotate said spindle motor after said first current is terminated.

2. The apparatus of claim 1, further comprising a temperature sensor for sensing a temperature of said disk.

3. The apparatus of claim 1, wherein said first current is provided to said spindle motor when said temperature is below a threshold value.

4. The apparatus of claim 1, wherein said first current is direct current.

5. The apparatus of claim 1, wherein said first current is alternating current.

6. The apparatus of claim 1, wherein said predetermined time interval is based on a temperature and a thermal impedance of said spindle motor.

7. The apparatus of claim 1, wherein said predetermined time interval is based on a plurality of said direct currents.

8. The apparatus of claim 1, wherein said predetermined time interval is based on a plurality of alternating currents.

9. The apparatus of claim 1, wherein said predetermined time interval is based on a temperature and a thermal impedance of said spindle motor.

10. An apparatus, comprising:
a disk;
a spindle motor comprising a coil;
means for providing a first current to said coil to heat said spindle motor, wherein said first current is applied for a predetermined time interval and subsequently terminated before a disk is rotated; and
means for providing a second current to said coil to rotate said spindle motor after said first current has terminated.

11. The apparatus of claim 10, further comprising a temperature sensor for sensing a temperature of said disk.

12. The apparatus of claim 10, wherein said means for providing said first current to said spindle motor applies said first current when said temperature is below a threshold value.

13. The apparatus of claim 10, wherein said first current is direct current.

14. The apparatus of claim 10, wherein said first current is alternating current.

15. The apparatus of claim 10, wherein said predetermined time interval is based on a plurality of said direct currents.

16. The apparatus of claim 10, wherein said predetermined time interval is based on a plurality of said alternating currents.

17. The apparatus of claim 10, wherein said predetermined time interval is based on a temperature and a thermal impedance of said spindle motor.

18. A method comprising:
activating a first circuit for providing a first current to a coil of a spindle motor to heat said spindle motor, wherein said first current is applied for a predetermined time interval before a disk is rotated;
terminating said first current using said first circuit after said first current is applied for a predetermined time interval; and
providing a second current to the coil of said spindle motor to cause said spindle motor to rotate said disk associated therewith using a second circuit.

19. The method of claim 18, further comprising sensing a temperature of said disk and providing said first current to said spindle motor when said temperature is below a threshold value.

* * * * *